May 3, 1966  C. F. WOODHOUSE  3,249,103
METHOD AND APPARATUS FOR MEASURING BIOELECTRONIC PARAMETERS
Filed Jan. 21, 1963
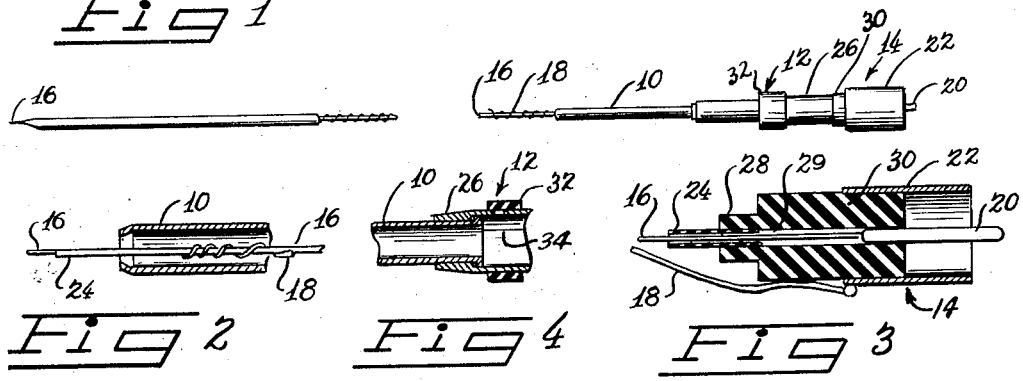
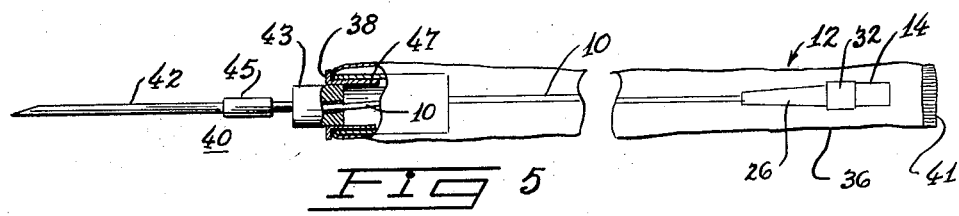
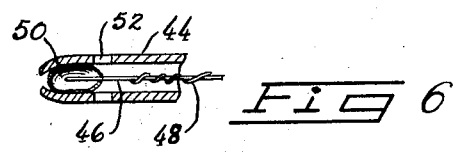
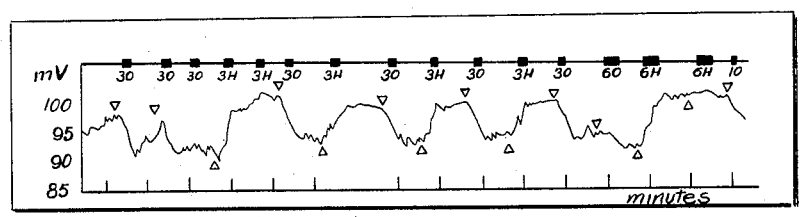
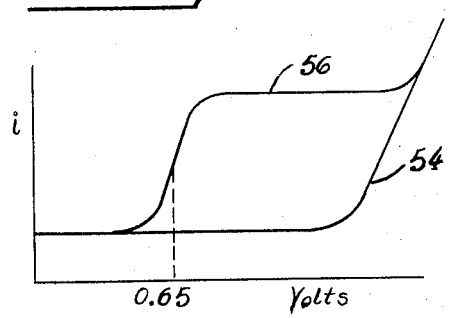
INVENTOR.
Charles F. Woodhouse
BY
Pendleton, Neuman,
Seibold & Williams Attys

United States Patent Office 3,249,103
Patented May 3, 1966

3,249,103
METHOD AND APPARATUS FOR MEASURING BIOELECTRONIC PARAMETERS
Charles F. Woodhouse, 5638 S. Dorchester St., Chicago, Ill.
Filed Jan. 21, 1963, Ser. No. 252,993
14 Claims. (Cl. 128—2.1)

This invention relates to a method and apparatus for measuring bioelectronic parameters in humans, and more particularly to an electrode mechanism for measuring electrical potentials and currents at any desired point within a living human.

In the past it has been diffcult to determine whether human tissue is viable, i.e. whether it is getting a blood supply. It is very important in the treatment of hip fractures that the viability of the femoral head be known so that it may be removed if it is dead. If the femoral head is not removed, the operation fails in 30% of all such fractures, and a second major operation has to be performed. The inventor has already proven clinically that polarographic analysis of oxygen tension within the femoral head will determine its viability with better than 90% accuracy. Woodhouse, "An Instrument for the Measurement of Oxygen Tension in Bone" 33 Journal of Bone and Joint Surgery 819 (September 1961). There is a need for a method and apparatus for immediately determining qualitatively whether tissue at other given points of the human body is viable, possesses a normal blood supply, and is in metabolic balance. It is also desirable that such determinations be made in vivo, i.e. in a living body rather than in vitro, by examination of fluids or pieces removed from the body.

In the prior art, it has not been possible to make these determinations with sufficient accuracy to render them useful. Prior art methods for making such determinations have usually required the extraction from the patient of a number of blood samples at different intervals, and examining such samples in vitro. Other methods have employed a hypodermic needle or the like as an electrode, which greatly limits the places at which such determinations can be made.

Further, such hypodermic needle electrodes are prohibitively expensive for any but reserach use. The present invention, on the other hand, embodying plastic and minimal constructions could cost $5.00, be used once and thrown away. This invention makes practical the measurement of bioelectronic parameters in the clinical, rather than the reserach, patient.

It is also desirable to determine and measure certain bioelectronic parameters of the body as a diagnostic tool. Such parameters are useful to the physician in much the same way as are the more common parameters of temperature and blood pressure. These parameters, may, by their absolute value, and by their variation with time, help a physician to make a prognosis and to determine quantitatively the effect of the treatment being given the patient. There is, therefore, a need for a method and apparatus for quantitatively measuring bioelectronic parameters, and for making such measurements in vivo.

Three of the parameters which can be quantitatively measured by the present invention, in situ within the blood vessels of the patient, are the redox potential of the blood, the pH value of the blood, and the dissolved oxygen tension ($pO_2$) within the blood.

The redox potential is the voltage as determined by the standard Mernst thermodynamic equation and increases or decreases with a change in the ratio of the specific concentrations of "oxidant" or "reductant" present. As used herein, the term "oxidant" means any substance which accepts electrons, and the term "reductant" means any substance which gives up electrons. Various quantities of both kinds of substances are constantly in the blood stream, and their ratio is an index of the metabolism of the biological system being investigated.

The pH of the blood stream is closely confined in living humans between the limits of 7.35 and 7.45 by homeostatic buffer mechanisms involving active phosphates and bicarbonates. Within these limits, however, the exact value of pH is often significant in making a prognosis and determining the effect of treatment.

The dissolved oxygen tension is an index of the amount of oxygen which is being introduced into the blood stream by the lungs, and is also an important parameter for diagnosing and treating disorders. As used herein, the term "dissolved oxygen" refers to oxygen concentration in moles per liter, and "dissolved oxygen tension" refers to the concentration of oxygen per atmosphere of pressure acting on the solution. Thus, although these terms are related, they are not identical since the oxygen concentration depends upon not only the solubility co-efficient of the solvent, but also upon the pressure and temperature of the solution.

All of these parameters may be measured in vivo in humans by the introduction of a pair of electrodes into a blood vessel at the location to be inspected, and measuring the potential or current between the two electrodes. The potential between the electrodes is a function of both the pH and the reduction potential, the significance of either one of which may be made prominent by the selection of appropriate materials for the electrodes. The current flow between the two electrodes when a specified voltage is maintained across them is an index of the dissolved oxygen tension.

Accordingly, it is an important object of the present invention to provide a method for measuring bioelectronic parameters in vivo within the blood vessels of a biological system.

It is another object of the present invention to provide an inexpensive and disposable electrode apparatus which may be inserted into a blood vessel via a catheter to obtain a measurement, and then discarded.

It is a further object of the present invention to provide a pair of electrodes, one of which is kept in contact with a standard solution, and the other in contact with the blood within a blood vessel.

It is another object of the present invention to provide an electrode which may be placed in a human blood vessel via a catheter, and a mechanism for introducing a saline solution into the catheter to serve as a standard solution.

It is a further object of the present invention to provide a method for quickly obtaining an indication of a patient's bioelectronic parameters at a given location within the patient.

It is another object of the present invention to provide a method by which the bioelectronic parameters of a patient may be constantly monitored over a period of time, in order to attain an immediate indication of the patient's response to given stimuli occurring during that period.

In one embodiment of the invention, there is provided a pair of electrodes comprising an active electrode and a reference electrode, both of which are introduced into a blood vessel of a patient by means of a catheter. The interior of the catheter is filled with a saline solution which is electrically in contact with the blood in the blood vessel, and the reference electrode. The active electrode is insulated, except for its tip, which is free of insulation to permit such tip to be in electrical contact with the blood. An electrical circuit is thus closed which circuit includes the reference electrode, the saline solution, the blood, and the active electrode. The potential between the two electrodes is measured with a high input impedance electronic voltmeter or the like to give an indication of the redox potential and the pH of the blood. The value of the measured potential may then be translated into a quantitive indication of either the reduction potential or the pH, or both, in order to provide information useful in forming a prognosis and analyzing treatment.

In another embodiment of the present invention, a pair of electrodes is inserted into the blood vessel of a patient through a catheter, and a predetermined voltage is applied between the two electrodes. The current passing through the circuit including the two electrodes and the blood in the blood vessel is then measured to give a quantitative indication of the dissolved oxygen present in the blood.

Other objects and advantages of the present invention will be apparent to those skilled in the art with reference to the accompanying drawings in which:

FIG. 1 is an illustration of an electrode mechanism constructed in accordance with the present invention;

FIG. 2 is an enlarged cross section of the tip of the apparatus of FIG. 1;

FIG. 3 is an enlarged cross section of the electrical connector associated with the apparatus of FIG. 1;

FIG. 4 is an enlarged cross-sectional view of an adaptor associated with the apparatus of FIG. 1, for connecting a catheter-type tube to the apparatus of FIG. 3;

FIG. 5 is a view of a catheter-type tube, adaptor, and electrical connector in a sterile package with which the structure of FIGS. 1 and 4 is adapted to be used;

FIG. 6 is an enlarged cross-sectional view of the tip of a second embodiment of apparatus embodying the present invention;

FIG. 7 is an illustration of a graph showing variations of potential present at the electrodes of apparatus embodying the present invention in response to certain controlled conditions; and FIG. 8 is an illustration of a graph of a current-voltage characteristic obtained with apparatus embodying the present invention.

Referring now to FIG. 1, there is illustrated an electrode structure in combination with a catheter-type tube which embodies the present invention. The catheter-type tube 10 is connected to an adaptor 12, which in turn is connected to an electrical connector 14. Within the catheter-type tube 10, there is disposed a platinum active electrode 16 comprising a relatively fine wire, covered with an insulating layer, and a silver reference electrode 18 comprising a second relatively fine wire which is not insulated. The active electrode 16 is electrically connected to a central pin 20 of the electrical connector 14, while the reference electrode 18 is electrically connected to the outer rim 22 of the electrical connector 14. The active electrode 16 extends beyond the tip of the catheter-type tube 10, while the reference electrode 18 terminates interiorly of the tube 10, as more clearly shown in FIG. 2. Although, in FIGS. 1 and 2, the reference electrode 18 is illustrated as being wound about the active electrode 16, this has been done only for the purpose of illustrating more clearly that two conductors are included within the tube 10, and in actual practice, the electrodes may be either in parallel relation or wound about each other as illustrated. The electrode 16 is provided with an insulating coating 24 for the entire length of the electrode 16, except for the tip thereof which is left uninsulated. The length of the uninsulated portion of the electrode 16 is preferably on the order of one-quarter of an inch, but is not critical, as will appear more clearly hereinafter. The end of the tube 10 adjacent the tip of the electrode 16 is adapted to be inserted within a blood vessel while the other end of the tube 10 is secured to a tubular adaptor 12 (FIG. 4) adapted to receive, in tightly fitting sealing engagement therewith, a boss 28 extending axially from the electrical connector 14. The electrical connector 14 comprises a circular cylindrical solid member 30, which is constructed of insulating material and is preferably a molded plastic such as "nylon" or "Teflon." The boss 28 is integral with the insulating member 30. The active electrode 16, with its insulating covering 24, fits tightly in a central bore 29 centrally disposed within the insulating member 30, so that no leakage of fluid within the tube 10 may pass through the insulating member 30, and also to prevent the electrode 16 from being in electrical contact with the fluid within the tube 10. Interiorly of the insulating member 30, the active electrode 16 is soldered to the central pin 20, while the reference electrode 18 passes through the tubular adaptor 26, around the boss 28 which is positioned within the adaptor 26, and is soldered to the rim 22 of the electrical connector 14. The diameter of the reference electrode 18 is so small, that the seal between the adaptor 26 and the boss 28 is not impaired. The reference electrode 18 is uninsulated for its entire length, and terminates within the tube 10 at a position spaced from the end thereof as illustrated in FIG. 2. The interior of the tube 10 is adapted to be filled with an electrolyte, by introduction of the needle of a conventional syringe or the like through a resilient self-sealing collar 32 which surrounds a portion of the tube 10 having an aperture 34. The needle of the syringe is inserted through the collar 32 and the aperture 34, so that the electrolyte may be discharged into the interior of the tube 10. The collar 32 is preferably constructed of soft rubber, to maintain a sealing relation between the interior and exterior of the tube 10, and to close and seal the hole in the collar 32 made by the needle of the syringe, when such needle is withdrawn.

Referring now to FIG. 5, there is illustrated a sterile package within which the apparatus of FIGS. 1 to 4 may be packaged prior to use. The tube 10 together with the adaptor 12 and the electrical connector 14 are illustrated as being contained within a tubular sheath 36, which is secured at one end to a plastic collar 38 and sealed at the other end 41. The tubular sheath 36 is secured to the collar 38 by being disposed between the collar 38 and a tightly fitting ring 47 overlying collar 38. The needle assembly 40 comprises a needle 42 having a hub 43 adapted to fit tightly into a central aperture of the collar 38 in sealing engagement therewith, and a bevel cover 45 slidably mounted on the needle 42. The tip of the tube 10 is disposed within the needle 42, but does not protrude therefrom. A sterile needle cover (not shown) is slidably mounted on the bevel cover 45 to completely enclose the needle assembly 40, and is removed when the apparatus is used.

In the use of the apparatus, the needle 42 is inserted into a vein in the usual manner, and then the collar 38 together with the ring 47 and the sheath 36 is pulled away from the hub 43 of the needle assembly 40, and discarded. The tube 10 is thereupon pushed up into the vein for as great a distance as desired, and then the needle 42 is withdrawn from the vein and slid back along the tube 10, without disturbing the position of the tube 10 within the vein. Thereafter the bevel cover 45 is slid along the needle to cover the tip thereof, the electrical connector 14 is connected to a voltage measuring apparatus, and the interior of the tube 10 is filled with an electrolyte by inserting the needle of a syringe through the aperture 34.

When the tube 10 has been filled with electrolyte, the electrolyte forms a bridge to complete an electrical circuit between the reference electrode 18 and the blood within the vein, which is prevented from flowing into the catheter by the saline electrolyte solution. The blood, in turn, is in contact with both the electrolyte and the tip of the active electrode 16. Thereupon, a complete electrical circuit is formed which extends from the central pin 20 to the electrolyte, to the reference electrode 18, and then to the rim 22 of the electrical connector 14. The potential which is thereby manifested between the pin 20 and the rim 22 is then a function of the pH value of the blood, and the reduction-oxidation potential of the blood.

The present apparatus may be used to administer intravenous fluids for nourishment, medication, etc., coincident with the measurements being made, or after the measurements have been completed. This is accomplished merely by connecting a source of fluid to a syringe and inserting the latter through the aperture 34 as described.

This relation is generally expressed by the formula where the observed potential V is in volts:

$$V = E_h + .059 pH - KT \ln \frac{[red]}{[ox]}$$

where $E_h$ is the potential of a hydrogen electrode, about $-1.226$ v., K is a constant for the particular apparatus, T is temperature and the quantity $$\frac{[red]}{[ox]}$$

is the redox potential, equal to the ratio of the specific activities of the concentrations of reductants and oxidants participating in chemical reactions taking place in the blood vessel being investigated. The cardinal number expressing the redox potential is based on the voltage of the hydrogen electrode under standard conditions, which is the term $E_h$ in the formula. Thus, it is a voltage with respect to a voltage standard. The observed potential and the hydrogen electrode potential are expressed in volts, the pH is expressed in standard pH units (the reciprocal of the logarithm of hydronium ion concentration), and the constant K in the last term of the equation is such as to permit the temperature and redox potential to be measured in any convenient scale. The term ln is the conventional designation of a logarithm to the base $e$.

The minus signs in the formula, and in the above definition of $E_h$, indicate that the associated terms contribute a negative potential at an active electrode, relative to a reference electrode.

The apparatus of the present invention can be calibrated by predetermining $E_h$ and K for the particular electrode structure and temperature being used. Since the observed potential between the pin 20 and the rim 22 is the function solely of the pH and the redox potential of the blood, the calibration of the electrodes permits the quantitative determination of one quantity when the other is known.

In man, and other biological systems, the pH is automatically held rigidly between narrow limits of 7.35 and 7.45, by active buffer mechanisms of homeostasis. Thus the maximum possible variation of the observed potential, due to pH, as indicated by the above formula is about six millivolts. The redox potential, however, is very poorly, if at all, buffered in biologic systems, and thus changes in the reductant-oxidant ratio, while small in terms of actual concentrations, may produce large shifts of the observed potential and any change is due primarily to the change in reduction-oxidation systems. In man, this potential shift may be large, ranging from $-60$ millivolts to over $-300$ millivolts, as compared to the maximum voltage shift of 6 millivolts due to maximum pH change which is still compatible with the life of the organism. A quantitative determination of the redox potential of the blood within the vein under investigation may be determined by measuring the pH in vitro by any known process, whereupon the second term on the right hand side of the equation becomes a constant, and the equation reduces entirely to a function of the redox potential. This is appropriate in biological systems in which the pH is invariant.

If, however, the pH of the biological system may vary, although such variation must be between narrow limits as indicated above, the actual value of the pH of the blood may be measured by the apparatus illustrated in FIG. 6.

In FIG. 6, the tip of a catheter-type tube 44 is illustrated, which is provided with an active electrode 46 and a reference electrode 48. The active electrode 46 is provided with an insulating coating, except for its tip, and is in electrical contact with an electrolyte contained within a thin walled hollow glass bead 50, or closed cylinder of pH sensitive glass. The insulation on the electrode 46 prevents any electrical contact between the conductor 46 and anything other than the internal electrolyte of the glass bead 50. The hollow glass bead 50 is wedged in position at the terminal portion of the tip of the tube 44, and is in electrical contact with the blood within the vein in which the tube 44 is placed. Between the glass bead 50 and the end of the reference electrode 48, a plurality of apertures 52 are provided in the tube 44 to permit the electrolyte within the tube 44 to be in electrical contact with the blood in the blood vessel to form a complete circuit between the electrode 46 and the reference electrode 48 in series through the electrolyte in the glass bead 50, the thin wall of the glass bead itself, the blood, and the electrolyte in the tube.

The structure illustrated in FIG. 6 is operative to produce an electrical potential between the two electrodes 46 and 48, which is insensitive to variations in redox potential, because of the characteristics of the glass bead. This effect is achieved because the glass of the bead 50 develops a potential between its inside and outside surfaces which varies only with hydronium ion concentration, thus measuring the pH, which potential is unaffected by redox potential. Therefore, the potential existing between the electrodes 46 and 48 is wholly a function of the pH of the blood, which may be determined quantitatively by calibrating the apparatus of FIG. 6 against known pH values of standard solutions. It will be understood that although only the tip of the tube 44 is illustrated in FIG. 6, in all other respects it is similar to the apparatus illustrated in FIGS. 1 through 5, and the apparatus is used in the identical manner, the only difference being the significance of the potential which is produced.

It will be understood, from the above, that the apparatus of FIG. 6 may be used to determine directly the pH of the blood, whereupon the apparatus of FIGS. 1 through 5 may be used to determine directly the redox potential of the blood, by inserting the measured value of pH in the above equation. Alternatively, the apparatus of FIGS. 1–5 may be adapted to measure the pH of the blood by substituting iridium for the platinum in the active electrode 16. Although the iridium electrode, like the platinum eletcrode, is responsive to changes in redox potential, its output is substantially determined by the pH of the blood under investigation, and the effect of different redox potentials can ordinarily be neglected, unless the situation calls for extreme accuracy. In that instance, the apparatus of FIG. 6 may be used.

The two electrodes adapted for measuring pH and redox potential may be successively inserted at the same point within a vein, in order to determine the pH and redox potential at that point, or may be simultaneously inserted in the same vein, a slight distance apart in order to obtain a continuous determination of the electrical potentials existing between both pairs of electrodes, to continuously monitor the pH and redox potential of the blood.

FIG. 7 is a graph of the potential which is obtained in the operation of the electrode structure illustrated in FIGS. 1 and 5, when the electrodes 16 and 18 are inserted into a blood vessel of an animal, and the animal is caused to breathe a number of breaths of either oxygen or hydrogen as indicated on the upper scale of FIG. 7, where 3H indicated three breaths of hydrogen, and 3O indicates three breaths of oxygen, and one of the triangles marks the time of the first such breath of hydrogen, etc. The abscissa of FIG. 7 is time in minutes. Thus the observed potential between two electrodes at the starting point shows —95 millivolts, while after three breaths of oxygen, the redox potential increases to —90 millivolts, and later returned to —95 millivolts. Three more breaths of oxygen drove the redox potential to about —92 millivolts, where it remained for about a minute until three breaths of hydrogen caused the redox potential to fall sharply to —100 millivolts and then to about —103 millivolts. The redox potential continued to vary down in repsonse to hydrogen, and up in response to oxygen as shown in the graph. The effect of the graph of FIG. 7, is to indicate that the tissue surrounding the tip of the active electrode during the test is viable, i.e. the blood supply is carrying the oxygen necessary for that tissue to survive. In other words, the tissue surrounding the tip of the active electrode was receiving a blood supply which responded to the respiratory system of the animal. Instead of breathing hydrogen or oxygen, the patient may simply hold his breath as long as he can, or breathe deeply and rapidly, to produce the same resultant variation in redox potential.

The graph 7 also illustrates some other parameters of the biological system under observation, namely (1) the time required for a given stimuli operating on the respiratory system to affect the blood supply at the point of investigation, and (2) the time for which the redox potential is driven to what appears to be its minimum or maximum value in response to breathing oxygen or hydrogen. These parameters are also valuable in studying the animal and its biological system, and extreme variations in these parameters give clues to the speed of the circulation of the blood within the circulatory system, the efficiency of the respiratory system, and the metabolic balance of the organism.

The apparatus illustrated in FIGS. 1 to 5 is also useful for determining another parameter of a biological system, namely the dissolved oxygen tension within the blood stream. When so used, the central conductor 20 and the rim 22 are connected in series with a source of voltage and a microammeter, the noble metal electrode being polarized as a cathode. The source of voltage is first short-circuited, and the microammeter read to determine the reference current, if any, flowing through the electrical circuit due to junction potentials, etc. The voltage is thereafter set at a value of 0.65 volt, and the current indicated by the microammeter again observed. The difference between the two observed currents is directly proportional to the dissolved oxygen tension within the blood between the two electrodes. When the electrode structure is so used, it may be calibrated by measuring the dissolved oxygen tension of a known solution, in order to obtain a quantitative measurement of the dissolved oxygen tension in the biological system being investigated. A qualitative determination of viability may be made without calibrating the electrode structure, by obtaining a graph such as that illustrated in FIG. 7, with a recording device connected to the electrical connector 14. Such a graph indicates the relative variation of dissolved oxygen tension in response to given stimuli on the respiratory system. If there is a correspondence between such variation and such stimuli, viability is established.

Referring to FIG. 8, there is illustrated a voltage-current characteristic curve of distilled water at 54, while the curve 56 illustrates the characteristic curve of distilled water to which has been added some dissolved oxygen. In the vicinity of 0.65 volt, the current rises steeply, to reach a plateau, where the current remains substantially constant until the curve 56 rejoins the curve 54 to produce a sharply increasing current in response to increasing voltage. The height of the plateau 56, when measured in blood or mammalian tissue, is dependent primarily upon the dissolved oxygen tension but is also dependent in part upon the electrochemical reaction of other redox compounds which may be present.

At about 0.65 volt, however, the current is almost completely dependent upon the dissolved oxygen tension, and, accordingly, accurate quantitative determinations of this parameter may be made.

When the structure of the present invention is used to determine dissolved oxygen tension, the interior of the catheter-type tube 10 is filled with electrolyte in the manner which has been described, and a platinum electrode 16 is in contact with the blood, while a silver electrode 18 is in contact with the electrolyte. When so used, the platinum electrode 16 is connected as the cathode, and the silver electrode 18 is connected as the anode. In the use of the structures of FIGS. 1 and 5 in determining redox potential, however, the active electrode 16 is preferably platinum, and the reference electrode 18 is preferably silver which has been chloridized in the manner well-known to those skilled in the art. The preferred electrolyte is a saline solution, which does not react with the chloridized silver electrode. A 0.9 N saline solution is preferred because it is biologically compatible with the blood, and is a suitable electrolyte. Rhodium may be employed instead of platinum for the active electrode 16 in measuring redox potential or dissolved oxygen tension, and iridium may be employed for measuring pH. In each case, the electrode need not be composed entirely of the indicated noble metal, it being sufficient that merely the surface in contact with the blood be composed of the metal. Thus, electrodes may be formed by plating the noble metal over the surface of a more base metal. This plating may be accomplished by electroplating, sputtering, vacuum deposition, or other methods well-known in the art.

The thickness of the active and reference electrodes 16 and 18 is not critical since such a slight amount of current flows during the process of makiing a measurement that there is substantially no reduction of potential due to current flow through the electrodes. The preferred diameter of both the active and reference electrodes is about 5 mils, which represents about the best compromise between cost of the electrode, and the rigidity necessary to insert the electrode within the blood vessel being investigated. The uninsulated tip of the electrode 16 extends from the tube 10 only as great a distance as is required to bring it into contact with the blood within the blood vessel, i.e. preferably about 0.25 inch.

Having thus described embodiments of my invention, it will be appreciated by those skilled in the art that certain modifications and changes may be made therein without departing from the esesntial features which may properly be said to constitute my invention, and which are intended to be limited only by the appended claims.

I claim:

1. The method of measuring bioelectronic parameters in vivo, comprising the steps of inserting a first electrode into actual physical contact with blood within a blood vessel, completing an electrical circuit between said first electrode and a second electrode, placing said second electrode in electrically conducting relationship with said blood by disposing an electrolyte in actual physical contact with both said blood and said second electrode, insulating said second electrode from said blood except through said electrolyte, and measuring the potential difference between said first and second electrodes, when there is substantially no current flowing in said circuit.

2. The method according to claim 1, wherein said first electrode is inserted into said blood vessel within a catheter-type tube.

3. The method according to claim 1, including the step of inserting a hollow needle into said blood vessel, said first electrode being inserted into said blood vessel by passing it through said needle.

4. The method according to claim 1, including the step of introducing a fluid into said blood vessel concurrently with making said measurement.

5. The method of indicating whether tissue at a predetermined location within an animal is viable comprising the steps of placing a first electrode adjacent said tissue, regulating the amount of oxygen assimilated by said animal, placing said second electrode in electrically conducting relationship with said tissue by disposing an electrolyte in actual physical contact with both said tissue and said second electrode, insulating said second electrode from said tissue except through said electrolyte, and measuring the electrical potential between said first electrode and a reference electrode, whereby any detectable electrical potential variation in response to the amount of oxygen assimilated by said animal, indicates that said tissue is viable.

6. Apparatus for measuring a bioelectronic parameter of blood in vivo comprising an insulating catheter-type open ended tube, means for inserting the open end of said tube into a blood vessel, a first insulated electrode disposed in said tube and having an uninsulated end portion projecting beyond said tube, a second uninsulated electrode disposed within said tube, the end portion of said second electrode terminating within said tube near the open end thereof, for completing an electrical circuit between said blood and said second electrode, and means for measuring the electrical potential between said first and second electrodes, while substantially no current is flowing through said circuit.

7. Apparatus according to claim 6, including means for introducing an electrolyte into said tube to complete an electrical circuit between said blood and said second electrode.

8. Apparatus according to claim 7, wherein said tube has an elastic portion, and said means for introducing an electrolyte comprises a hollow needle adapted to be inserted into said tube through said elastic portion, said hollow needle being connectable to a source of electrolyte, said elastic portion being adapted to elastically seal itself upon the withdrawal of said needle.

9. Apparatus according to claim 6, wherein said tube has an electrical connector secured to the exterior end thereof, said first and second electrodes being electrically connected to said connector, means for sealing said tube about said connector to maintain said tube fluid-tight, and means electrically interconnecting said connector with said measuring means.

10. Apparatus for measuring a bioelectronic parameter in vivo comprising a hollow glass bead containing an electrolyte, a conductor electrically connected to said electrolyte, means for inserting said bead into a blood vessel, a reference electrode, means for completing an electrical circuit between said reference electrode and said conductor, said circuit being partly formed by blood within said blood vessel, and partly by a wall of said glass bead, and means for measuring the potential difference across said circuit when there is substantially no current flowing in said circuit.

11. Apparatus for measuring the amount of dissolved oxygen present in a circulating blood system comprising first and second electrodes, means for inserting said first and second electrodes into a blood vessel to place one of said electrodes in direct electrical contact with the blood within said blood vessel, means for separately applying first and second potential differences across said first and second electrodes, and means for indicating the values of current flowing between said first and second electrodes in response to said first and second potential differences, the difference between said current values being proportional to the amount of dissolved oxygen present.

12. Apparatus for measuring bioelectronic parameters in vivo comprising a catheter-type open ended tube, said open end being adapted to be inserted into a blood vessel, said tube having within it first and second electrodes, said first electrode extending for the length of said tube, said first electrode having a tip portion protruding from said tube and adapted to be in actual physical contact with fluid in said blood vessel, said first electrode having an insulating coating except for said tip, said second electrode being in electrical contact with fluid in said tube, means for admitting fluid into said blood vessel through said tube from an outside source, and means for measuring the electrical characteristics of the blood between said first and second electrodes.

13. Apparatus according to claim 12, wherein said means for admitting fluid comprises a conduit connected with the interior of said tube, and means for connecting said conduit with a source of pressurized fluid, whereby said fluid flows into said blood vessel.

14. Apparatus according to claim 12, wherein said means for admitting fluid comprises a resilient collar surrounding a portion of said tube, said tube having an aperture opening onto the interior surface of said collar, whereby a needle may be inserted into said tube through said resilient collar and fluids may be passed therethrough into said tube.

References Cited by the Examiner

UNITED STATES PATENTS

| 2,339,579 | 1/1944 | Milne | 128—2.1 |
| 2,416,949 | 3/1947 | Perley | 324—30 |
| 2,637,316 | 5/1953 | Grez | 128—2.1 |
| 2,913,386 | 11/1959 | Clark | 324—30 |
| 3,000,805 | 9/1961 | Carritt | 128—2 |
| 3,049,118 | 8/1962 | Arthur | 128—2 |
| 3,060,923 | 10/1962 | Reiner | 128—2.1 |
| 3,083,706 | 4/1963 | Woodhouse | 128—2.1 |
| 3,098,813 | 7/1963 | Beebe | 128—2.1 |

RICHARD A. GAUDET, *Primary Examiner.*

LOUIS R. PRINCE, SIMON BRODER, *Examiners.*